US006754232B1

United States Patent
Tasker

(10) Patent No.: US 6,754,232 B1
(45) Date of Patent: Jun. 22, 2004

(54) DYNAMIC CODEC SPEED SELECTION AND BANDWIDTH PREALLOCATION IN A VOICE PACKET NETWORK METHOD AND APPARATUS

(75) Inventor: Michael E. Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/481,776

(22) Filed: Jan. 12, 2000

(51) Int. Cl.$^7$ .......................... H04L 12/26; H04L 12/66; H04J 3/18
(52) U.S. Cl. ........................ 370/477; 370/252; 370/352; 370/465; 370/401; 709/226
(58) Field of Search ............................. 370/252, 253, 370/352–353, 355, 354, 357, 395.2, 395.21, 395.51, 395.52, 395.6, 465, 466, 467, 468, 477

(56) References Cited

U.S. PATENT DOCUMENTS

| | | | |
|---|---|---|---|
| 6,396,849 B1 * | 5/2002 | Sarkissian et al. | 370/490 |
| 6,584,108 B1 * | 6/2003 | Chung et al. | 370/401 |
| 6,600,740 B1 * | 7/2003 | Valentine et al. | 370/365 |
| 6,611,531 B1 * | 8/2003 | Chen et al. | 370/458 |
| 6,614,781 B1 * | 9/2003 | Elliott et al. | 370/352 |
| 6,657,970 B1 * | 12/2003 | Buckingham et al. | 370/249 |

* cited by examiner

Primary Examiner—Afsar Qureshi
(74) Attorney, Agent, or Firm—Marger Johnson & McCollom, PC

(57) ABSTRACT

Dynamic compressor/decompressor (codec) speed selection includes monitoring a call in a telephone system to determine the type of codec being used thereon and to measure the payload on the codec. The capacity of the codec is determined based upon the determined type of codec being used. Speed selection further includes comparing the determined capacity with the measured payload; and selectively switching the call to a higher operational speed based upon the result of the comparing. Preferably, the monitoring includes detecting a modem answer tone of the telephone call and basing the determination of the type of codec at least partly thereon. The monitoring also preferably includes detecting silence of the telephone call and basing the selective switching at least partly thereon. Echo cancellation and/or suppression is disabled upon such selective switching. In accordance with one embodiment of the invention, the switching includes requesting an up-speed codec. In such case, the method further includes verifying network bandwidth prior to the requesting of the up-speed codec. The network bandwidth is pre-allocated in accordance with the invention after the up-speed codec is requested and prior to the selective switching of the call to a higher operational speed. Finally, the monitoring further includes determining whether the call is silent and upon such determination automatically switching the call back to a lower operational speed.

45 Claims, 2 Drawing Sheets

DYNAMIC CODEC SPEED SELECTION AND BANDWIDTH PREALLOCATION IN A VOICE PACKET NETWORK METHOD AND APPARATUS

BACKGROUND OF THE INVENTION

This invention relates to compression/decompression device (codec) speed selection within a voice packet network, and more specifically to method and apparatus for dynamic selection of codec speed based upon demand to provide an optimal match between voice and data payload bandwidth requirements and codec bandwidth capacities.

In voice packet networks such as voice over frame relay (VoFR) or voice over Internet protocol (VoIP), voice overlays data in digitized, packetized, usually compressed form. Thus, relatively low-speed voices and relatively high-speed modem data share codecs used to compress and decompress the data at the endpoints. If it is possible to determine the voice or modem nature of the payload during placement of a telephone call, then it is possible to allocate an appropriate bandwidth of an appropriate codec to the telephone call. However, payload demands may vary even within a given telephone call. For example, a telephone line may have a handset as well as a fax or modem and a telephone call may switch between data and voice during a given telephone connection. As a result, even if the payload requirement is properly understood at the beginning of a telephone call, it may change its nature during the telephone call. This can result in loss of data, if bandwidth is under-allocated. It can also result in waste of channel resource, if bandwidth is over-allocated. There is presently no mechanism for productively handling the dynamically changing demands of channel bandwidth in such mixed-use network contexts.

SUMMARY OF THE INVENTION

Dynamic compressor/decompressor (codec) device speed selection includes monitoring a call in a telephone system to determine the type of codec being used thereon and to measure the payload on the codec. The capacity of the codec is determined based upon the determined type of codec being used. Speed selection further includes comparing the determined capacity with the measured payload; and selectively switching the call to a higher operational speed based upon the result of the comparing. Preferably, the monitoring includes detecting a modem answer tone of the telephone call and basing the determination of the type of codec at least partly thereon. The monitoring also preferably includes detecting silence of the telephone call and basing the selective switching at least partly thereon. Echo cancellation and/or suppression is disabled upon such selective switching. In accordance with one embodiment of the invention, the switching includes requesting an up-speed codec. In such case, the method further includes verifying network bandwidth prior to the requesting of the up-speed codec. The network bandwidth is pre-allocated in accordance with the invention after the up-speed codec is requested and prior to the selective switching of the call to a higher operational speed. Finally, the monitoring further includes determining whether the call is silent and upon such determination automatically switching the call back to a lower operational speed.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
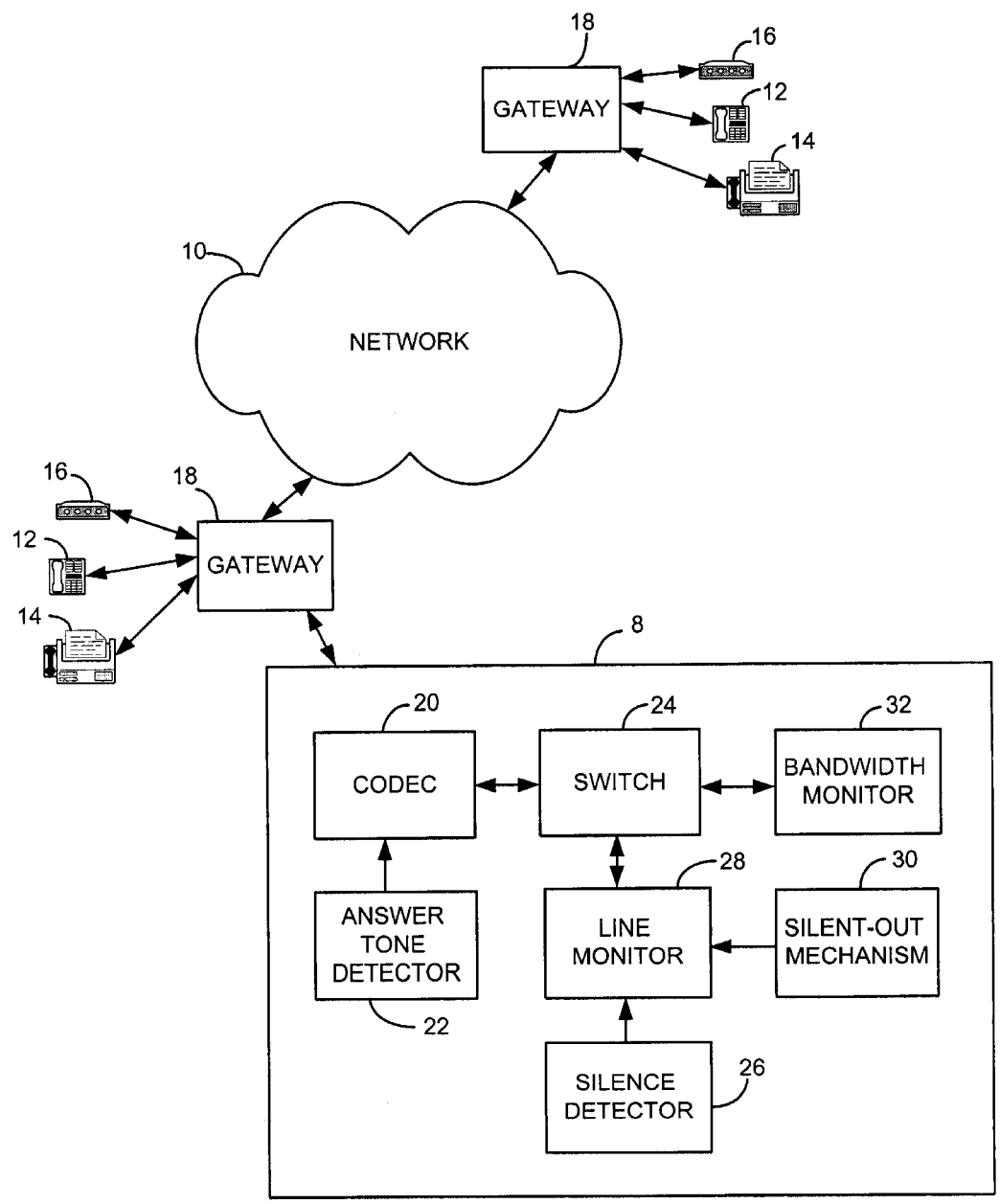
FIG. 1 is a block diagram illustrating a voice over frame relay telephone system providing dynamic codec speed selection in accordance with the invention.

FIG. 1 illustrates the invented apparatus 8 coupled with a network 10 operating with respect to voice traffic thereon in accordance with a voice packet protocol such as a voice over frame relay (VoFR) protocol or voice over Internet protocol (VoIP). Network 10 typically includes one or more telephone handsets 12, one or more fax machines 14 and one or more modems 16 representing different traffic demands on network 10 due to their diverse bandwidth requirements. Faxes 14 and modems 16 communicating digitized data require relatively high bit rates of approximately 32 k–56 k bits/second or higher. The faxes and modems often share telephone numbers with the telephone handsets to provide facsimile, e-mail and Internet service to users/clients.

Handsets 12 communicating voice require relatively low bit rates of only approximately 2.4–4.8 k bits/second. Typically, plural handsets 12 are connected with each one of plural voice gateways 18 representing so-called endpoint nodes within network 10. Each gateway 18 typically includes plural compression/decompression utilities (codecs) 20 that digitize and packetize voice signals from handsets 12 and multimedia files for routing them over network 10. It will be appreciated by those of skill in the art that codecs 20 typically are implemented in software or firmware or a combination thereof, and refers herein to any hardware, firmware or software combination that performs one or both of the data compression/decompression functions. Thus, traffic on network 10 has diverse bandwidth requirements due to the multimedia, i.e. digital data and voice, nature of the digital payload.

It is the broadband nature of the voice packet protocol operating within network 10 that creates the unique challenge of dynamic codec speed selection. Before the advent of voice frame protocols, all traffic within a network or telephone system was of the same nature. In other words, analogue voice was routed on the public switched telephone network (PSTN) and digital data was routed on wide area networks (WAN). Then, codec and speed selection were relatively static and need not change with widely varying demands. Presently, however, the distinction between voice and data is blurred, as voice is increasingly carried in digitized, packetized form over the Internet in accordance with a growing number of protocols. It will be understood that VoFR and VoIP are but two examples of the context in which the present invention may find particular utility and that others within the spirit and scope of the invention are contemplated. Such digitized, packetized voice traffic, routed via gateways 18 through network 10, is virtually indistinguishable from the more traditional packetized data traffic, but for the lower bandwidth requirements of voice data.

Codecs 20 are of a relatively low-bit rate variety, e.g. codecs of the G.729, G.729A, G.726 type or of a higher-bit rate variety, e.g. codecs of the G.711 (mulaw or alaw) type. Those of skill in the art will appreciate that the G.711 codec operates without data compression, whereas the others perform compression and decompression of data. The VoFR protocol often uses codecs conforming to international standards such as the FRF.11 specification promulgated by the Frame Relay Forum. The International Telecommunications Union-Telecommunications Standardization Section (ITU-T), which succeeded the Comite Consultif International de Telegraphique et Telephonique (CCITT), promulgates telecommunications standards for codecs including the G.726, G.729 and G.729A speech coders and modem answer tones (under V0.25) referenced herein.

FIG. 1 also shows a modem answer tone detector 22 coupled to gateway 18. Answer tone detector 22 detects energy in the 2100 Hz range that characterizes the standardized modem answer tone. Answer tone detector 22 signals when a modem is detected at call-originating or call-terminating network nodes that define a channel within network 10, e.g. the network nodes in which voice gateways 18 reside. Coupled with codec 20 is a switch 24 that, responsive to the modem detection signaling from detector 22 automatically up-speeds codec 20 in accordance with the invention. Where a codec switch is required and the payload sizes for two codecs are the same, codec switching can be performed by adding a control message using one of the unassigned FRF.11 payload types. For example, payload type E is specified but unassigned, and may be used in accordance with the invention to perform end-to-end messaging between network nodes, thereby facilitating codec up-speeding and down-speeding based upon changing demands. Those of skill in the art thus will appreciate that it is possible within the spirit and scope of the invention to achieve all of the advantages of the invention within the existing standards framework that characterizes networks like network 10.

On the other hand, a useful alternative to using switch messaging as described above is to have each transit node monitor the contents of each packet and detect the modem answer tone on a node-by-node basis (including the originating and terminating nodes). Upon detection of a modem signal, each node would invoke a pre-assigned (high-speed) codec switch. Upon detection of silence, i.e. a zero payload, each node would revert to the original (low-speed) codec.

Coupled with switch 24 is a silence detector 26, which monitors the modem and signals switch 24 when the detected modem is idle. Switch 24, responsive to the signaling from silence detector 26 in accordance with the invention, automatically down-speeds codec 20. Thus, the invented apparatus via codec 20 effectively de-allocates network bandwidth when it is determined that network traffic no longer requires a high-speed channel for a given network node. Those of skill in the art will appreciate that silence detector 26 may be implemented in any suitable way. For example, silence detector 26 may simply monitor the modem for a predefined period of time during which no energy within the audible spectrum is sensed and signal switch 24 that silence has been detected.

As noted above, plural discrete codecs 20 generally may be associated with a given gateway 18. Thus, in accordance with the invention, switch 24 may select from among plural codecs 20 having different speed capacities a suitable one of the codecs. A suitable codec might mean a higher-speed one of the plural codecs 20, such that switch 24 selects a higher speed codec in response to a signal from modem answer tone detector 22. Those of skill in the art will appreciate that the higher-speed codec 20 selected by switch 24 may be a fixed-speed codec or a variable-speed codec. In either case, up-speeding in accordance with the invention is achieved when needed via codec selection among a plurality of codecs.

Alternatively, switch 24 may responsive to modem answer tone detector 22 perform such up-speeding in accordance with the invention by selecting a higher operational speed of one of the plural codecs 20. Thus, a connected codec 20 is made to operate at a higher speed, in accordance with its integral up-speed selection mode of operation to achieve the up-speeding in response to traffic demand. Those of skill in the art will appreciate that, within the spirit and scope of the invention, down-speeding of the codec mechanism, e.g. via selecting a lower operational speed of the one of the plural codecs, may be accomplished as described above when silence is detected.

Preferably, the invented apparatus also includes a line monitor 28 for monitoring the telephone line and/or modem at either or both nodes to confirm successful up-speeding of the codec mechanism 20. Line monitor 28 in a preferred embodiment of the invention measures up-speed bandwidth in both directions on the line being monitored, i.e. in both the transmit and receive directions of the channel, and then signals the apparatus of the successful up-speeding of codec mechanism 20.

Those of skill in the art will appreciate that it is possible that the up-speeding may not be accomplished. For example, one or both modems or codecs at either node may be unavailable or unable to comply with an up-speed selection. In this event, in accordance with the invention, a silent-out mechanism 30 responsive to line monitor 28 is provided for down-speeding upon such failure to up-speed within a predefined period of time. Silent-out mechanism, upon detecting such failure, signals switch 24 to down-speed codec mechanism 20. Switch 24 may accomplish such a down-speeding by discarding packets for a predetermined time after a failure to confirm the desired up-speeding.

Yet another feature of the invented apparatus is the provision of a bandwidth monitor 32 for over-riding a request or command from switch 24 to up-speed codec mechanism 20. Bandwidth monitor 32 preferably monitors the bandwidth of the network and upon detection of insufficient bandwidth to up-speed a given codec mechanism 20, bandwidth monitor 32 actively over-rides the codec up-speed request from switch 24. Thus, switch 24 or codec mechanism 20 in this embodiment of the invention is responsive to bandwidth monitor 32 in the unusual event of up-speed request over-ride. In this way, the invented apparatus is dynamically responsive to changing demands on network 10.

Figure 2:
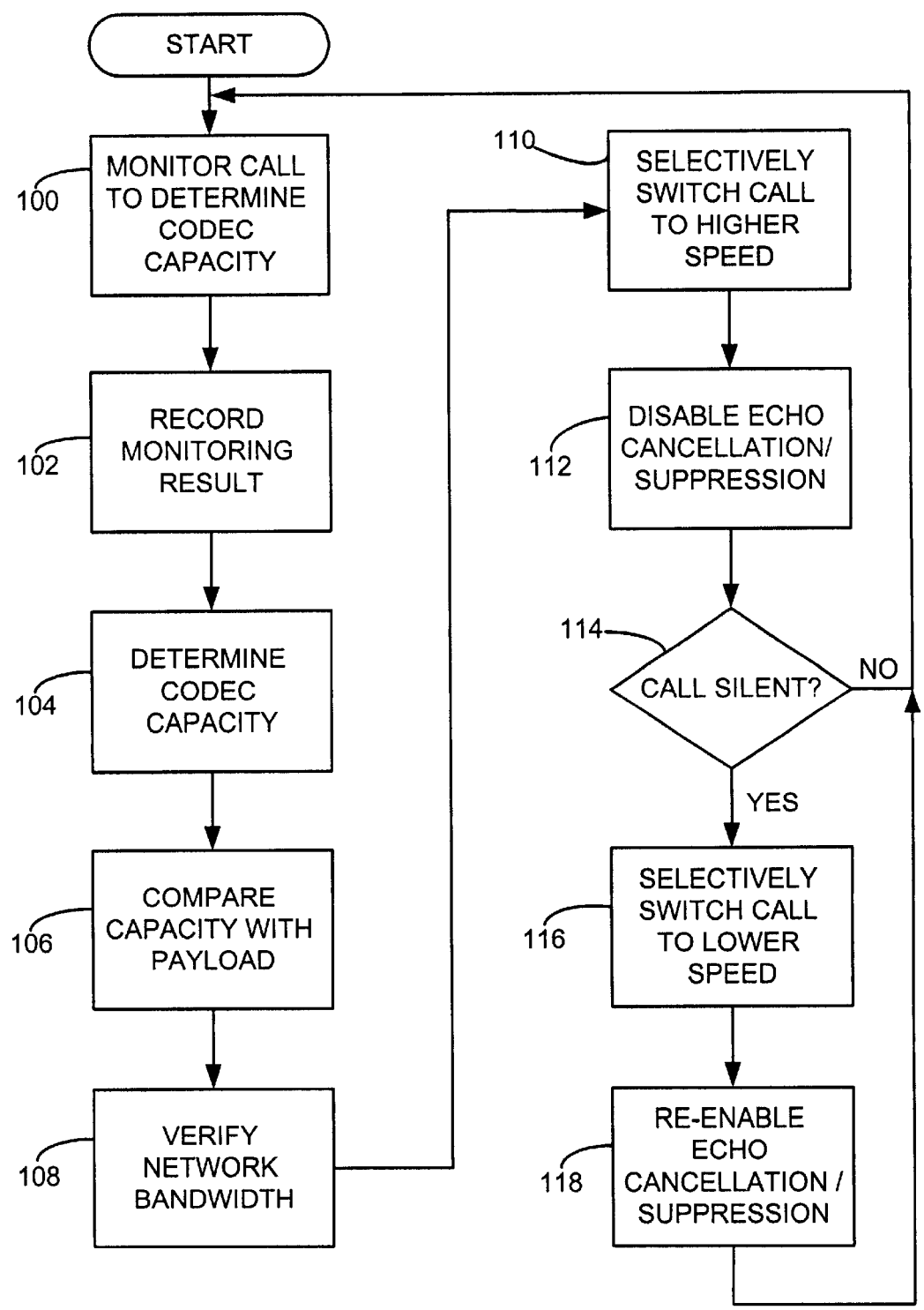
FIG. 2 is a flow chart illustrating the codec speed selection method in accordance with the invention.

FIG. 2 pictorially illustrates the invented method described above. The method STARTS at block 100, where a call on a telephone line is monitored to determine codec capacity. Optionally, at 102, the result of such monitoring is recorded, as in a memory device associated with the apparatus. At 104, the capacity of codec or codec mechanism 20 is determined, by any suitable means such as a table look-up based upon the type of codec that is determined to be in use for the given call being monitored. At 106, the determined capacity of the codec is compared with the current payload of the codec. Those of skill in the art will appreciate that this block effectively produces a measure of the relative utilization, e.g. over-utilization or under-utilization, of a given codec resource.

At 108, in accordance with a preferred method of the invention, the network bandwidth is verified, i.e. it is determined whether an up-speed operation of the given codec is possible without appreciable negative impact on overall or local network performance. Such preferably is performed by bandwidth monitor 32, as described above. At 110 the call is selectively switched to a higher speed codec, whether by up-speeding the given codec 20 or selecting a higher speed codec 20. Such selection will be understood by those of skill in the art to be based, at least in part, upon the determination of codec capacity, payload and network bandwidth availability.

At 112, echo cancellation and/or suppression are disabled, preferably by signaling a destination telephone number. At 114, it is determined, e.g. by use of silence detector 26, whether the modem associated with the call is idle. If not, i.e. if the modem is active, then monitoring continues. If the call is determined to be silent, then at 116 the call is selectively switched to a lower speed, again whether by down-speeding the given codec 20 or by switching to another, lower-speed codec 20. Finally, at 118 echo cancellation and/or suppression are re-enabled and monitoring continues.

Those of skill in the art will appreciate that block 108 may involve bandwidth pre-allocation by which not only is network bandwidth verified, but also managed to ensure capacity. For example, within the spirit and scope of the invention, a request for an up-speeding of a codec may be accepted or denied based upon the relative availability of network bandwidth. The mechanism for accepting or denying such a request from switch 24 may be at the destination codec for a given call. In the event that bandwidth is unavailable, the larger voice packets from the high bit rate codec at the source for the given call are simply discarded. The high bit rate codec at the source for the given call, i.e. the up-speed initiator, then detects the success or failure of the codec up-speeding based on reception of up-speed codec packets returned from the far end of the call.

Dynamic bandwidth management as described herein, that is instantaneously responsive to changing traffic demands on network 10, is especially useful in multi-hop network configurations. Within the spirit and scope of the invention, management as used herein also may include accounting, whereby the results of such up-speed requests and bandwidth allocation changes based thereon are recorded and reports are generated.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. In a voice packet network, a dynamic codec speed selection method comprising:
   monitoring a call in a telephone system to determine the type of codec being used thereon and to measure the payload on the codec;
   determining the capacity of the codec based upon the determined type of codec being used;
   comparing the determined capacity with the measured payload; and
   selectively switching the call to a higher operational speed based upon the result of said comparing.

2. The method of claim 1 which further comprises recording the result of said monitoring.

3. The method of claim 1 wherein said switching is performed by signaling the codec in accordance with a voice over frame relay (VoFR) protocol.

4. The method of claim 3 wherein the VoFR protocol is FRF.11.

5. The method of claim 1 wherein said monitoring includes detecting a modem answer tone of the telephone call and basing the determination of the type of codec at least partly thereon.

6. The method of claim 5 wherein said detecting is of a modem answer tone of the telephone call at either a source or destination telephone number, which further comprises signaling whether the modem answer tone is detected at the source or the destination telephone number.

7. The method of claim 1 wherein said monitoring includes detecting silence of the telephone call and basing said selective switching at least partly thereon.

8. The method of claim 1 which further comprises disabling echo cancellation upon said selective switching.

9. The method of claim 1 which further comprises disabling echo suppression upon said selective switching.

10. The method of claim 1 wherein said switching includes requesting an up-speed codec.

11. The method of claim 10 which further comprises verifying network bandwidth prior to said requesting of the up-speed codec.

12. The method of claim 11 which further comprises pre-allocating network bandwidth after said requesting of the up-speed codec and prior to said switching.

13. The method of claim 1 wherein said monitoring further includes determining whether the call is silent and upon such determination automatically switching the call to a lower operational speed.

14. The method of claim 13 wherein said determining is of silence of a defined duration.

15. The method of claim 14 wherein said defined duration is programmable to support a modem pass-through mode of operation and a fax pass-through mode of operation.

16. The method of claim 13 which further comprises re-enabling echo cancellation upon said automatic switching to a lower operational speed.

17. The method of claim 13 which further comprises re-enabling echo suppression upon said automatic switching to a lower operational speed.

18. The method of claim 13 wherein said automatic switching to a lower operational speed includes requesting a down-speed codec.

19. The method of claim 1 which further comprises signaling a destination telephone number upon said selective switching to disable echo cancellation and suppression.

20. The method of claim 19 wherein said signaling is performed over the telephone line bearing the detected modem traffic.

21. The method of claim 20 wherein said signaling is performed by passing through the voice bearer channel path a prescribed end-to-end control message instructing the destination telephone number to disable echo cancellation and suppression.

22. Apparatus for use in a dynamic codec switching system for modem signals carried via a voice over frame relay (VoFR) protocol over a voice frame network, the apparatus comprising:

a codec mechanism coupled with one or more network nodes;

a modem answer tone detector for signaling when a modem is detected at a call-originating or call-terminating network node defining a channel therebetween; and a switch coupled with said codec mechanism and responsive to the modem detection signaling for automatically up-speeding the codec mechanism.

23. The apparatus of claim 22 which further comprises a silence detector for signaling when the detected modem is idle, wherein said switch responsive to the silence detection signaling automatically down-speeds the codec mechanism.

24. The apparatus of claim 22 wherein said codec mechanism includes plural discrete codecs of different speed capacity and wherein such switch performs such up-speeding by selecting a higher-speed one of said plural discrete codecs.

25. The apparatus of claim 22 wherein said codec mechanism includes one or more codecs of selectable speed and wherein said switch performs such up-speeding by selecting a higher operational speed of the one or more codecs.

26. The apparatus of claim 22 which further comprises a line monitor for confirming such up-speeding of the codec mechanism after such signaling.

27. The apparatus of claim 26 wherein said line monitor confirms such up-speeding by measuring up-speed bandwidth in both the transmit and receive directions of the channel.

28. The apparatus of claim 26 which further comprises a silent-out mechanism responsive to said line monitor in the event that up-speeding is not confirmed thereby within a predefined period of time, said silent-out mechanism signaling said switch to down-speed the codec mechanism.

29. The apparatus of claim 28 wherein said silent-out mechanism performs said signaling of said switch by discarding packets for a predefined period of time after a failure of said line monitor to confirm such up-speeding.

30. The apparatus of claim 22 which further comprises a bandwidth monitor responsive to said switch for over-riding said switch to deny such up-speeding of the codec mechanism upon detection of insufficient bandwidth in the network.

31. A computer-readable medium containing a program for selecting the speed of a codec for use in a voice packet network, the program comprising:

instructions for monitoring a call in a telephone system to determine the type of codec being used;

instructions for determining the capacity of the codec based upon the determined type of codec being used;

instructions for comparing the determined capacity with the measured payload; and instructions for selectively switching the call to a higher operational speed based upon the result of said comparing.

32. The computer-readable medium in accordance with claim 31 wherein the program further comprises:

instructions for recording the result of such monitoring.

33. The computer-readable medium in accordance with claim 31 wherein the program further comprises:

instructions for disabling echo cancellation upon such selective switching.

34. The computer-readable medium in accordance with claim 31, wherein such switching includes requesting an up-speed codec, and wherein the program further comprises:

instructions for verifying network bandwidth prior to such requesting of the up-speed codec.

35. The computer-readable medium in accordance with claim 34 wherein the program further comprises:

pre-allocating network bandwidth after such requesting of the up-speed codec and prior to such switching.

36. The computer-readable medium in accordance with claim 31 wherein said instructions for switching include instructions for signaling the codec in accordance with a voice over frame relay (VoFR) protocol.

37. The computer-readable medium in accordance with claim 31 wherein said instructions for monitoring include instructions for determining whether the call is silent and upon such determination automatically switching the call to a lower operational speed.

38. The computer-readable medium in accordance with claim 37 wherein such determining is of silence of a defined duration.

39. The computer-readable medium in accordance with claim 38 wherein such defined duration is programmable to support a modem pass-through mode of operation and a fax pass-through mode of operation.

40. The computer-readable medium in accordance with claim 37 wherein the instructions for re-enabling echo cancellation upon such automatic switching to a lower operational speed.

41. The computer-readable medium in accordance with claim 37 wherein the program further comprises:

instructions for re-enabling echo suppression upon such automatic switching to a lower operational speed.

42. The computer-readable medium in accordance with claim 31 wherein the program further comprises:

instructions for signaling a destination telephone number upon such selective switching to disable echo cancellation and suppression.

43. The computer-readable medium in accordance with claim 42 wherein such signaling is performed over the telephone line bearing the detected modem traffic.

44. The computer-readable medium in accordance with claim 43 wherein said instructions for signaling include instructions for passing through the voice bearer channel path a prescribed end-to-end control message instructing the destination telephone number to disable echo cancellation and suppression.

45. A computer-readable medium containing a program for selecting the speed of a codec for use in a voice packet network, the program comprising:

codec mechanism software coupled with one or more network nodes;

modem answer tone detector software for signaling when a modem is detected at a call-originating or call-terminating network node defining a channel therebetween; and switch software coupled with said codec mechanism software and responsive to the modem detection signaling for automatically up-speeding the codec mechanism software.

* * * * *

UNITED STATES PATENT AND TRADEMARK OFFICE
CERTIFICATE OF CORRECTION

PATENT NO.   : 6,754,232 B1
DATED        : June 22, 2004
INVENTOR(S)  : Tasker

It is certified that error appears in the above-identified patent and that said Letters Patent is hereby corrected as shown below:

Column 3,
Line 58, "higher speed codec" should read -- higher-speed codec --.

Column 8,
Line 27, "wherein the instructions" should read -- wherein the program further comprises: instructions --.

Signed and Sealed this

Eighth Day of February, 2005

JON W. DUDAS
*Director of the United States Patent and Trademark Office*